United States Patent [19]

Shimizu

[11] Patent Number: 5,400,074
[45] Date of Patent: Mar. 21, 1995

[54] VIDEO CAMERA DEVICE HAVING AN EXPOSURE CONTROL CIRCUIT

[75] Inventor: Shuji Shimizu, Kanagawa, Japan

[73] Assignee: Sony Corporation, Tokyo, Japan

[21] Appl. No.: 22,288

[22] Filed: Feb. 25, 1993

[30] Foreign Application Priority Data

Mar. 5, 1992 [JP] Japan .................................. 4-083415

[51] Int. Cl.6 ...................... H04N 5/238; H04N 5/232
[52] U.S. Cl. ..................... 348/363; 348/255
[58] Field of Search ............... 358/228, 209, 909, 174, 358/168; H04N 5/238, 5/243; 348/221, 229, 230, 347, 362, 363, 358, 255

[56] References Cited

U.S. PATENT DOCUMENTS

| | | | |
|---|---|---|---|
| 5,093,716 | 3/1992 | Kondo et al. | 358/228 |
| 5,258,848 | 11/1993 | Kondo et al. | 358/228 |

FOREIGN PATENT DOCUMENTS

| | | | |
|---|---|---|---|
| 0400605 | 12/1990 | European Pat. Off. | H04N 5/235 |
| 2-075285 | 3/1990 | Japan | H04S 5/232 |
| 3-222586 | 10/1991 | Japan | H04N 5/243 |
| 3-290638 | 12/1991 | Japan | H04N 5/232 |
| 4-107078 | 4/1992 | Japan | H04N 5/243 |

*Primary Examiner*—Joseph Mancuso
*Assistant Examiner*—Tuan V. Ho
*Attorney, Agent, or Firm*—Jay H. Maioli

[57] ABSTRACT

A video camera device includes an image signal level varying circuit for varying the signal level of an image signal; image signal level detecting circuit for detecting the signal level of the image signal; zoom lens position detecting circuit for detecting the position of a zoom lens; and brightness correcting circuit supplied with an output from the zoom lens position detecting means for correcting a brightness attenuating characteristic of the zoom lens responsive to the position of the zoom lens. The gain of the image signal level varying circuit is varied by an output of the image signal level detecting circuit and an output of the brightness correcting circuit.

3 Claims, 5 Drawing Sheets

VIDEO CAMERA DEVICE HAVING AN EXPOSURE CONTROL CIRCUIT

BACKGROUND OF THE INVENTION

1. Field of the Invention

This invention relates to a video camera device and, in particular, to a video camera device having an exposure control circuit.

2. Description of the Prior Art

There is known a video camera device using an inner focus lens assembly (lens block) as its lens system whose front lens is fixed and whose zoom lens and focus lenses are supported for movements in the lens assembly.

FIG. 1 shows a block diagram of a video camera device using such an inner focus lens assembly. In FIG. 1, an image entering through the inner focus lens assembly 51 is focused on a light detecting surface of a CCD image pickup device 53 through an iris 52. Opening and closing of the iris 52 is controlled in response to an output from an iris driving circuit referred to later. An output signal from the CCD image pickup device 53 is supplied to an AGC amplifier 54 whose gain is controlled in response to an output signal from a D/A converter described later.

An output signal from the AGC amplifier 54 is converted from an analog signal to a digital signal by an A/D converter 55. The digital signal is supplied to a signal processing circuit 56 and to a detecting circuit 57. The signal processing circuit 56 performs predetermined signal processing on the digital signal supplied thereto, and then outputs it from an output terminal 58. The detecting circuit 57 detects the digital signal, and then supplies it to a comparator 59. A reference level setting circuit 60 is connected to the comparator 59 to set a reference level. An output signal from the comparator 59 is supplied to a control amount computing circuit 62 through a loop filter 61.

The control amount computing circuit 62 calculates a desired opening amount for the iris 52 and a desired gain for the AGC amplifier 54 based on the image signal level. Thereafter, an output from the control amount computing circuit 62 is supplied to an iris driving circuit 63 and to a D/A converter 64. Output from the iris driving circuit 63 is supplied to the iris 52 to control the opening amount thereof. The output signal from the control amount computing circuit 62 is also converted to an analog signal by a D/A converter 64 and is supplied to the AGC amplifier 54 to control the gain thereof.

FIG. 2 shows an arrangement for the inner focus lens assembly 51. In FIG. 2, a first group lens F1 and a third group lens F3 of the inner focus lens assembly 51 are fixed while a second group lens F2 and a fourth group lens F4 can move. The second group lens F2 behaves as a zoom lens, and the fourth group lens F4 as a focus lens. The iris 52 is located between the zoom lens and the third group lens F3, and a color separating prism P is located between the focus lens and the CCD image pickup device 53.

Existing video camera devices involve the problem of F drop phenomenon. With reference to FIG. 3, F drop phenomenon is explained. In FIG. 3, incident light through the first group lens F1 is diverged by the zoom lens, and travels through the iris 52. After corrected in direction by the third group lens F3, the light is focused by the focus lens F4 to make an image on the CCD image pickup device 53.

FIG. 3A shows a beam of light travelling when the zoom lens is located at its wide end. Among the incident beam of light d, the beam of light that passes through the iris 52 has a diameter as large as the maximum open area of the iris 52. That is, the quantity of light passing through the iris 52 can be determined by changing the open area of the iris 52. FIG. 3B shows the beam of light travelling when the zoom lens is located midway between its wide and telephoto ends. The quantity of light passing through the iris 52 can be determined by changing the open area of the iris 52 as in FIG. 3A. FIG. 3C shows the beam of light travelling when the zoom lens is located at its telephoto end. In FIG. 3C, the diameter of the beam of light travelling through the iris 52 is smaller than the diameter of the maximum open area of the iris 52. Note that the diameter of the beam of light passing through the iris 52 is determined by the diameter of the first group lens F1.

The F drop phenomenon is that, because of shading of the beam of light caused by the first group lens F1, the diameter of the beam of light passing through the iris 52 becomes smaller than the maximum open area of the iris 52, and makes it impossible to vary the quantity of light even by changing the open area of the iris 52 (J in FIG. 3C).

FIG. 4 shows a gain curve A for the iris and a gain curve B for the AGC amplifier relative to the brightness of a subject in the existing video camera device. The abscissa indicates the quantity of light of the subject while the ordinate indicates the gain of the AGC amplifier. These gain curves are obtained by:

$$Q \times R \times S \times T = U \quad (1)$$

where Q is the brightness of the subject, R is the gain of the iris, S is the gain of the AGC amplifier, T is the photoelectric conversion ratio of the CCD image pickup device, and U is an output of the detecting circuit.

In equation (1), if the brightness of the subject is in a range in which exposure can be controlled, then the output of the detecting circuit is constant. However, if the F drop phenomenon occurs because of the position of the zoom lens in the inner focus lens assembly 51, it causes an iris blind zone (shown by E) which is a difference (F drop amount F) between the gain of the iris at the wide end (shown at position C) and the gain of the iris at the telephoto end (shown at position D), and the brightness is not changed even by opening and closing the iris. Moreover, equation (1) is not effective in the iris blind zone E, and the effectiveness of the iris decreases. Further, an unnaturalness is produced at the changeover between control by the iris and control by the AGC amplifier (shown at position G). The foregoing statement is indicated by:

$$Q \times V \times S \times T = U \quad (2)$$

where V is the actual gain of the iris, and by:

$$R - W = V \quad (3)$$

where R is the same as that of equation (1) and W is a gain corresponding to the F drop amount F.

If the first group lens has a larger diameter, then the F drop phenomenon would be removed. However, the use of larger lenses as the first group lens increases the scale and weight of the lens assembly itself. It does not meet the requirement of a decrease in scale and weight of video camera devices and invites an increase in the cost.

In addition, in case of the aforementioned video camera device in which the exposure control circuit controls the opening amount of the iris and the gain of the AGC amplifier in response to the image pickup signal level, an increase in the amount of F drop increases the region in which the image signal level cannot be changed even by controlling the open amount of the iris. As a result, unnaturalness is produced in the effect of iris variance at the changeover between the iris and the AGC amplifier control, and the performance of the circuit as an automatic exposure control circuit is significantly lowered.

OBJECTS AND SUMMARY OF THE INVENTION

It is therefore an object of the invention to provide a video camera device which removes the blind zone of its iris, and realizes natural exposure control by correcting the gain in response to the amount of an F drop.

According to an aspect of the invention, there is provided a video camera device comprising: image signal level varying means for varying the signal level of an image signal; image signal level detecting means for detecting the level of the image signal; zoom lens position detecting means for detecting the position of a zoom lens; and brightness correcting means supplied with an output from the zoom lens position detecting means for correcting the brightness attenuating characteristic of the zoom lens in response to the position of the zoom lens, the gain of the image signal level varying means being varied by an output of the image signal level detecting means and an output of the brightness correcting means.

According to the video camera device mentioned above the, blind zone of the iris caused by an F drop of the zoom lens is removed by controlling the open amount of the iris on the basis of an output from the zoom lens position detecting means, and the gain is corrected in, for example, an AGC amplifier by an amount corresponding to the blind zone of the iris.

According to another aspect of the invention, there is provided a video camera device comprising:
 a lens block for taking in light from a subject to the photographed;
 an iris for limiting the quantity of light from the lens block;
 an image pickup device for converting the light passing through the iris into an electric signal;
 an automatic gain control circuit for varying the signal level of an output signal from the image pickup device;
 an analog-to-digital converter for converting an output signal from the automatic gain control circuit into a digital signal;
 a video signal processing circuit for converting a digital signal from the analog-to-digital converter into a predetermined video signal;
 a signal level detecting circuit for detecting the signal level of an output signal from the analog-to-digital converter;
 a comparator for comparing an output signal of the signal level detecting circuit and a reference level;
 a zoom lens position detecting circuit for detecting the position of a zoom lens contained in the lens block; and
 a control amount computing circuit for determining a gain of the iris and a gain of the automatic gain control circuit on the basis of an output signal of the comparator and an output signal of the zoom lens position detecting circuit.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 5:
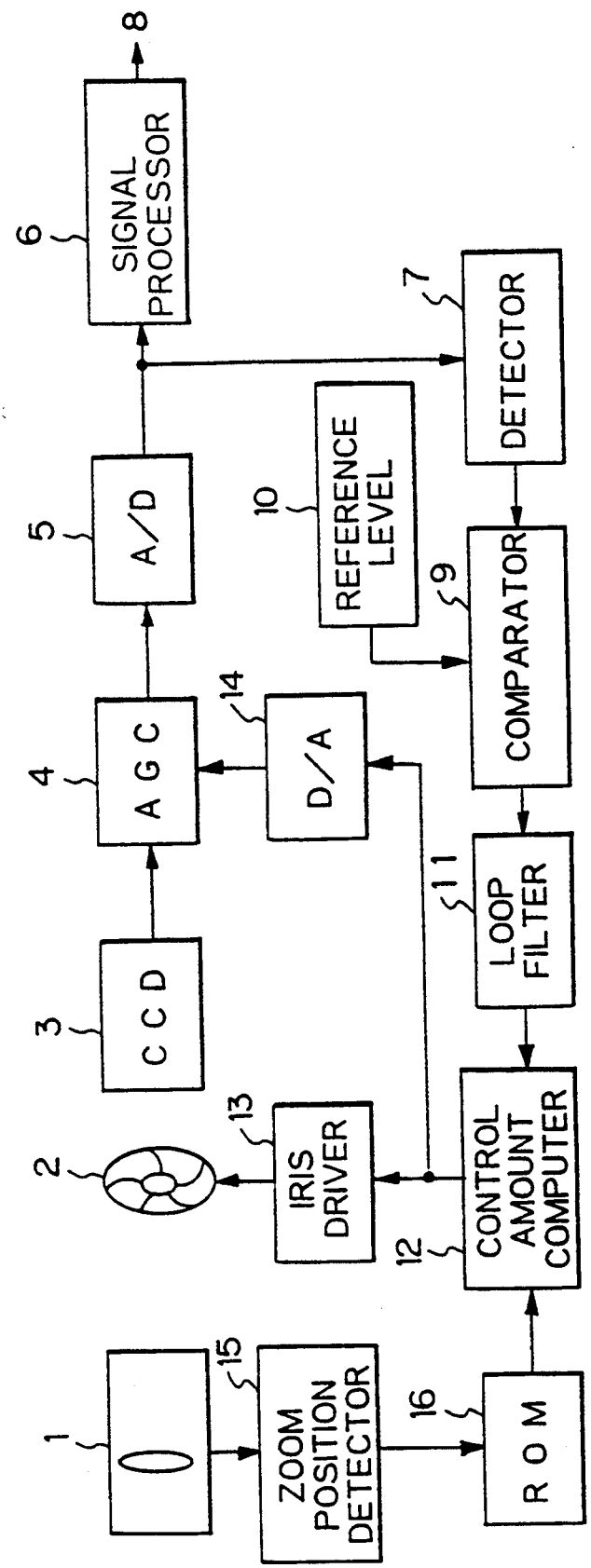
FIG. 5 is a block diagram of a video camera device to which the invention is applied.

An embodiment of the invention is explained below with reference to the drawings. FIG. 5 shows a block diagram of a video camera device to which the invention is applied. In FIG. 5, rays from a subject incident through the inner focus lens assembly 1 are focused into an image on a light detecting surface of a CCD image pickup device 3 through an iris 2. The open amount of the iris 2 is controlled by an output from an iris driving circuit referred to later.

An output signal from the CCD image pickup device 3 is supplied to an AGC amplifier 4. The gain of the AGC amplifier 4 is controlled in response to an output signal from a D/A converter referred to later. An output signal from the AGC amplifier 4 is converted from an analog signal into a digital signal by an A/D converter 5. The digital signal is supplied to a signal processing circuit 6 and to a detecting circuit 7. The signal processing circuit 6 performs predetermined signal processing on the digital signal supplied thereto, and outputs it from an output terminal 8.

The detecting circuit 7 detects the digital signal and supplies it to the comparator 9. A reference level setting circuit 10 is connected to the comparator 9 to set a reference level. An output signal from the comparator 9 is supplied to a control amount computing circuit 12 via a loop filter 11.

Figure 1:
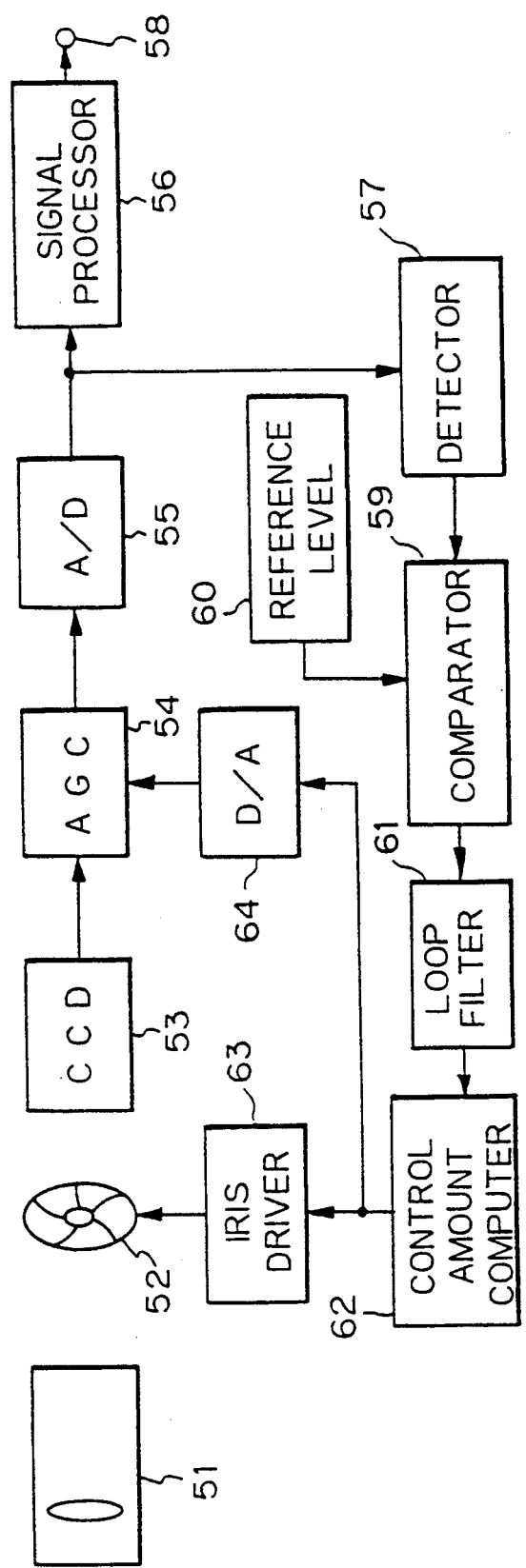
FIG. 1 is a block diagram of a video camera device for use in explanation of a prior art device.
Figure 2:
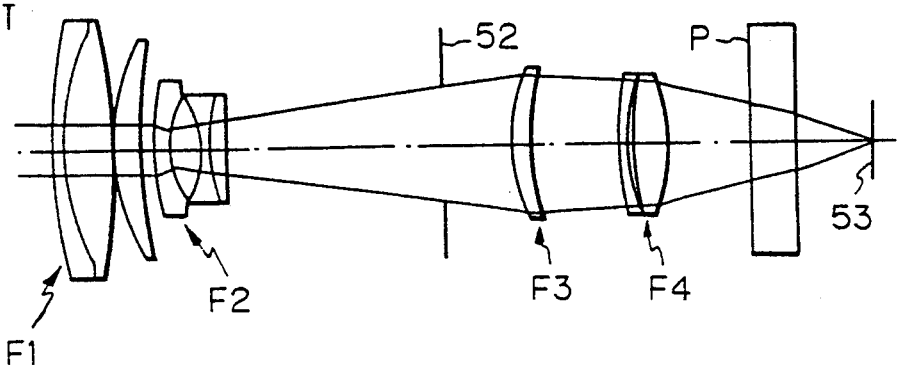
FIG. 2 is a schematic diagram showing an arrangement for an inner focus lens assembly.
Figure 3A:
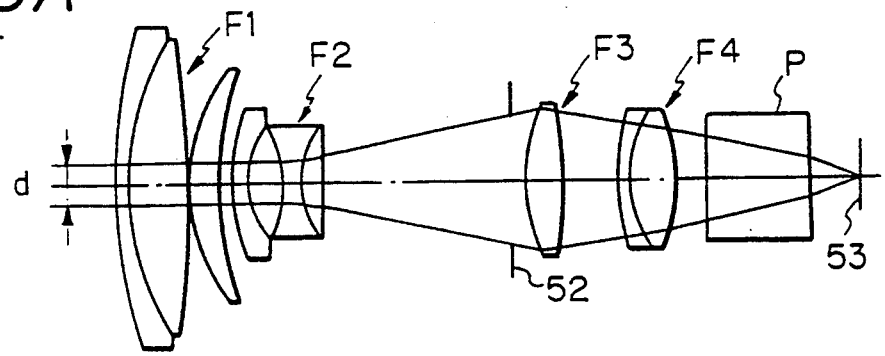
FIGS. 3A to 3C are schematic diagrams for use in explanation of F drop phenomenon.
Figure 3B:
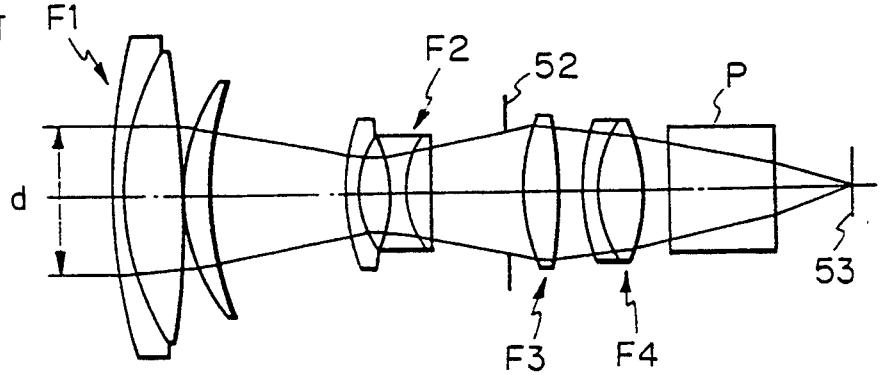
Figure 3C:
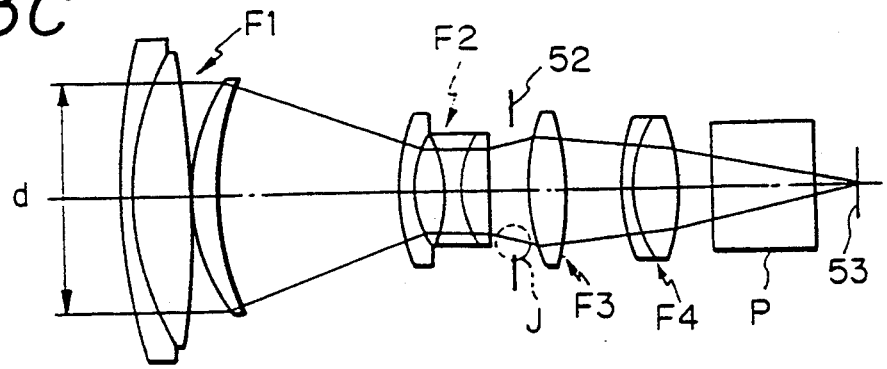
Figure 4:
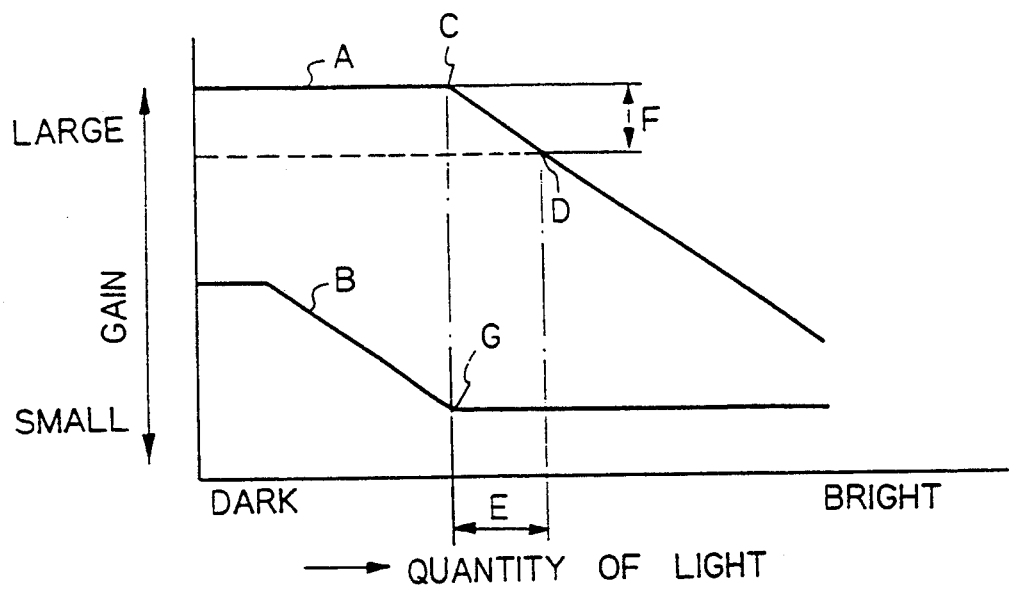
FIG. 4 is a graph showing a gain curve for an iris and a gain curve for an AGC amplifier in the prior art.
Figure 6:
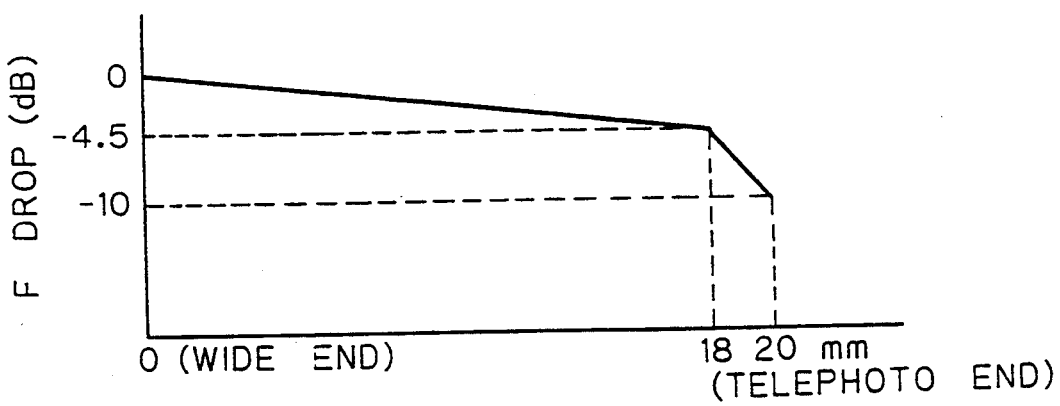
FIG. 6 is a graph showing the relation between the amount of movement of a zoom lens and the amount of F drop.

A zoom lens position detecting circuit 15 detects the amount of movement of the zoom lens in the inner focus lens assembly 1, and the detected amount is supplied to a ROM 16. The ROM 16 stores amounts of F drop F corresponding to various positions of the zoom lens as shown in FIG. 6. In FIG. 6, the abscissa indicates the position of the zoom lens, and the ordinate indicates the amount of F drop. An amount of F drop corresponding to a position of the zoom lens is supplied from the ROM 16 to the control amount computing circuit 12.

The control amount computing circuit 12 calculates an open amount for the iris 2 and a gain for the AGC amplifier 4 on the basis of outputs from the loop filter 11 and the ROM 16. Thereafter, an output from the control amount computing circuit 12 is sent to the iris driving circuit 13 and the D/A converter 14.

An output from the iris driving circuit 13 is sent to the iris 2 to control the open amount thereof. The output signal sent from the control amount computing circuit 12 and converted to an analog signal by the D/A converter 14 is sent to the AGC amplifier 4 to control the gain thereof.

Figure 7:
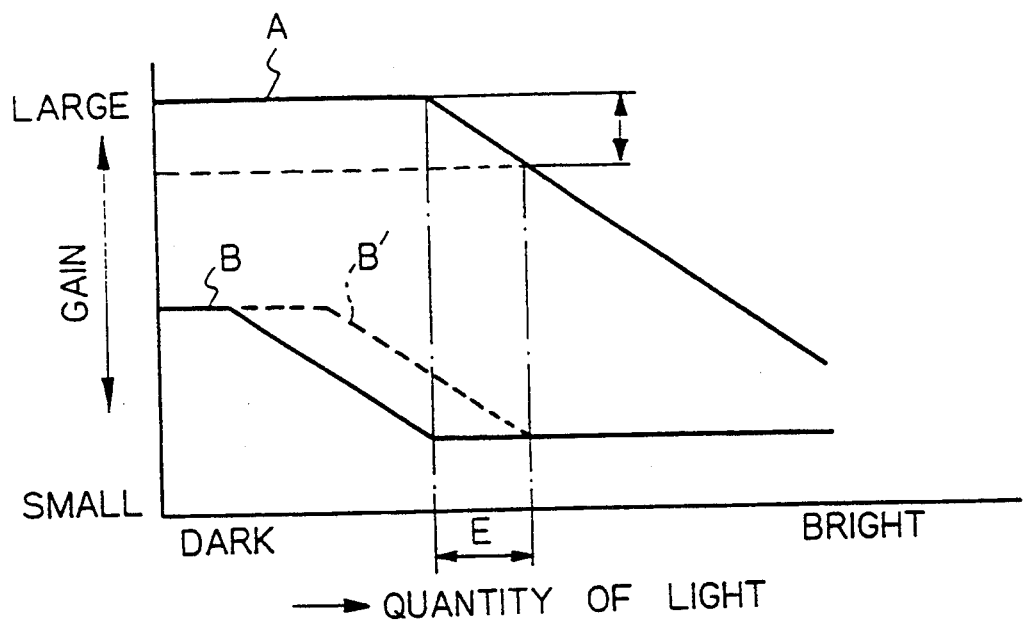
FIG. 7 is a diagram showing a gain curve for an iris and gain curves for an AGC amplifier.

FIG. 7 shows a gain curve A for the iris relative to the brightness of a subject and gain curves B and B′ for the AGC amplifier. The abscissa indicates the quantity of light from the subject, and the ordinate indicates the gain. These gain curves are defined by:

$$Q \times V \times (s+W) \times T = U \qquad (4)$$

In comparing equation (4) with equation (2), it is seen that although the third term of equation (2) is "S" alone, the third term of equation (4) is "(S+W)". That is, by adding to the gain of the AGC amplifier the gain "W" corresponding to the amount of F drop, the gain curve B of the AGC amplifier is corrected to the gain curve B′ shown by the broken line. As a result, the gain is corrected by the amount corresponding to the iris blind zone E, and the iris blind zone E is removed.

Figure 8:
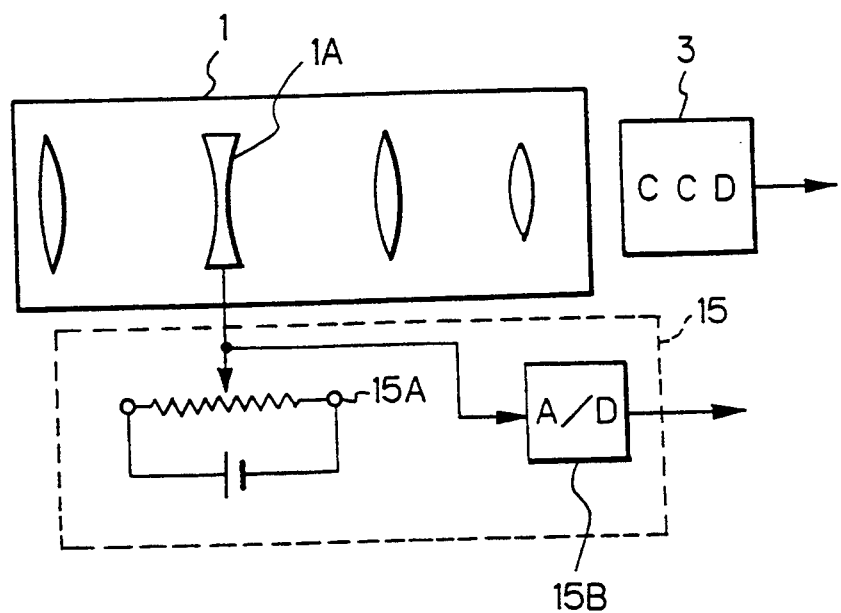
FIG. 8 is a block diagram showing an arrangement of a zoom lens position detecting circuit.

FIG. 8 shows an arrangement for the zoom lens position detecting circuit 15. In FIG. 8, the zoom lens position detecting circuit 15 includes a variable resistor 15A and an A/D converter 15B. An arm of the variable resistor 15A is coupled to a zoom lens 1A and to the A/D converter 15B. Fixed bias voltages are applied to electrodes at opposite ends of the variable resistor 15A, and the voltage at the variable contact between the variable resistor 15A and the arm varies in response to movements of the zoom lens 1A. The amount of a change in the voltage is converted to a digital value by the A/D converter 15B. The digital value from the A/D converter 15B is supplied to the ROM 16 as a signal indicating the position of the zoom lens.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, although the embodiment has been described as using the inner focus lens assembly as its lens system, the invention is not limited to this. Additionally, the invention may also be employed in still cameras.

According to the invention, the iris is controlled in its open amount in response to the amount of F drop, and the gain of the AGC amplifier is corrected by an amount corresponding to the amount of F drop. Therefore, the blind zone of the iris is removed, and changeover between control by the iris and control by the AGC amplifier is smoothed. As a result, natural exposure control of a video camera devices is possible.

What is claimed is:

1. A video camera device comprising:
a lens block for taking in light from a subject to be photographed;
an iris for limiting a quantity of light from said lens block in response to a control signal;
an image pickup device for converting light passing through said iris into an electric signal;
an automatic gain control circuit for varying a level of an output signal from said image pickup device in response to said control signal;
an analog-to-digital converter for converting an output signal from said automatic gain control circuit into a digital signal;
a video signal processing circuit for converting the digital signal from said analog-to-digital converter into a predetermined video signal;
a signal level detecting circuit for detecting a light level in the digital signal output from said analog-to-digital converter;
a comparator for comparing an output signal of said signal level detecting circuit and a reference level;
a zoom lens position detecting circuit for detecting the position of a zoom lens contained in said lens block;
a read only memory containing values of a brightness attenuating characteristic of said zoom lens corresponding to positions of said zoom lens, said memory being read out in response to an output from said zoom lens position detecting circuit; and
a control amount computing circuit for determining an opening amount of said iris and a gain of said automatic gain control circuit on the basis of an output signal of said comparator and an output from said read only memory and for producing said control signal fed to said iris and to said automatic gain control circuit to correct the brightness attenuating characteristic of said zoom lens.

2. The video camera device according to claim 1, wherein gain attenuating characteristics of said iris and said automatic gain control circuit are substantially the same.

3. The video camera device according to claim 2, wherein after the gain of said iris is performed, the gain control of said automatic gain control circuit is performed.

* * * * *